(12) United States Patent
Nobre et al.

(10) Patent No.: US 10,710,599 B2
(45) Date of Patent: Jul. 14, 2020

(54) SYSTEM AND METHOD FOR ONLINE PROBABILISTIC CHANGE DETECTION IN FEATURE-BASED MAPS

(71) Applicant: Toyota Research Institute, Inc., Los Altos, CA (US)

(72) Inventors: Fernando Nobre, Boulder, CO (US); Jeffrey M. Walls, Ann Arbor, MI (US); Paul J. Ozog, Ann Arbor, MI (US)

(73) Assignee: Toyota Research Institute, Inc., Los Altos, CA (US)

( * ) Notice: Subject to any disclaimer, the term of this patent is extended or adjusted under 35 U.S.C. 154(b) by 213 days.

(21) Appl. No.: 15/906,565

(22) Filed: Feb. 27, 2018

(65) Prior Publication Data

US 2019/0084577 A1 Mar. 21, 2019

Related U.S. Application Data

(60) Provisional application No. 62/559,007, filed on Sep. 15, 2017.

(51) Int. Cl.
*B60W 50/00* (2006.01)
*B60W 40/04* (2006.01)
(Continued)

(52) U.S. Cl.
CPC ........ *B60W 50/0097* (2013.01); *B60W 40/04* (2013.01); *B60W 40/06* (2013.01);
(Continued)

(58) Field of Classification Search
CPC .. B60W 40/06; B60W 40/04; B60W 50/0097; B60W 2420/52; B60W 2552/00;
(Continued)

(56) References Cited

U.S. PATENT DOCUMENTS 7,499,775 B2   3/2009  Filippov et al.
9,157,743 B2  10/2015  Ma et al.
(Continued)

OTHER PUBLICATIONS

D. M. Rosen, J. Mason, and J. J. Leonard, "Towards lifelong featurebased mapping in semi-static environments," in Robotics and Automation (ICRA), 2016 IEEE International Conference on. IEEE, 2016, pp. 1063-1070.
(Continued)

*Primary Examiner* — Mussa A Shaawat
(74) *Attorney, Agent, or Firm* — Christopher G. Darrow; Darrow Mustafa PC

(57) ABSTRACT

System, methods, and other embodiments described herein relate to identifying changes within a surrounding environment of a vehicle. In one embodiment, a method includes collecting, using at least one sensor of the vehicle, sensor data about the surrounding environment. The method includes analyzing the sensor data to identify features of the surrounding environment. The features are landmarks of the surrounding environment that are indicated within a map of the surrounding environment. The sensor data indicates at least measurements associated with the features as acquired by the at least one sensor. The method includes computing persistence likelihoods for the features according to a persistence model that characterizes at least prior observations of the features and relationships between the features. The persistence likelihoods indicate estimated persistences of the features to indicate whether the features likely still exist. The method includes controlling the vehicle according to the persistence likelihoods.

20 Claims, 5 Drawing Sheets

(51) Int. Cl.
| | |
|---|---|
| *B60W 40/06* | (2012.01) |
| *G01C 21/32* | (2006.01) |
| *G05D 1/00* | (2006.01) |
| *G05D 1/02* | (2020.01) |
| *G01C 21/36* | (2006.01) |

(52) U.S. Cl.
CPC ......... *G01C 21/32* (2013.01); *G01C 21/3602* (2013.01); *G05D 1/0088* (2013.01); *G05D 1/0274* (2013.01); *B60W 2420/42* (2013.01); *B60W 2420/52* (2013.01); *B60W 2552/00* (2020.02); *B60W 2554/00* (2020.02); *G05D 2201/0213* (2013.01)

(58) Field of Classification Search
CPC ............... B60W 2420/42; G01C 21/32; G01C 21/3602; G05D 1/0274; G05D 2201/0213
See application file for complete search history.

(56) References Cited

U.S. PATENT DOCUMENTS

| | | | |
|---|---|---|---|
| 9,395,190 | B1 | 7/2016 | Young et al. |
| 9,612,123 | B1 | 4/2017 | Levinson et al. |
| 9,672,736 | B2* | 6/2017 | Lovell .................. G08G 1/0104 |
| 9,734,455 | B2 | 8/2017 | Levinson et al. |
| 10,372,130 | B1* | 8/2019 | Kaushansky ........ G05D 1/0221 |
| 2008/0298638 | A1 | 12/2008 | Miyazaki |
| 2016/0282126 | A1 | 9/2016 | Watts et al. |
| 2017/0124476 | A1* | 5/2017 | Levinson ............. G05D 1/0088 |
| 2019/0056741 | A1* | 2/2019 | Zych ...................... G08G 1/165 |

OTHER PUBLICATIONS

T. Morris, F. Dayoub, P. Corke, G. Wyeth, and B. Uperoft, "Multiple map hypotheses for planning and navigating in non-stationary environments," in Robotics and Automation (ICRA), 2014 IEEE International Conference on. IEEE, 2014, pp. 2765-2770.

M. J. Milford and G. F. Wyeth, "Seqslam: Visual route-based navigation for sunny summer days and stormy winter nights," in Robotics and Automation (ICRA), 2012 IEEE International Conference on. IEEE, 2012, pp. 1643-1649.

A. Walcott-Bryant, M. Kaess, H. Johannsson, and J. J. Leonard, "Dynamic pose graph slam: Long-term mapping in low dynamic environments," in Intelligent Robots and Systems (IROS), 2012 IEEE/RSJ International Conference on. IEEE, 2012, pp. 1871-1878.

H. Andreasson, M. Magnusson, and A. Lilienthal, "Has something changed here? autonomous difference detection for security patrol robots," in Intelligent Robots and Systems, 2007. IROS 2007. IEEE/RSJ International Conference on. IEEE, 2007, pp. 3429-3435.

G. D. Tipaldi, D. Meyer-Delius, and W. Burgard, "Lifelong localization in changing environments," The International Journal of Robotics Research, vol. 32, No. 14, pp. 1662-1678, 2013.

P. Biber, T. Duckett, et al., "Dynamic maps for long-term operation of mobile service robots," in Robotics: science and systems, 2005, pp. 17-24.

F. Lu and E. Milios, "Globally consistent range scan alignment for environment mapping," Autonomous robots, vol. 4, No. 4, pp. 333-349, 1997.

P. Biber and T. Duckett, "Experimental analysis of sample-based maps for long-term slam," The International Journal of Robotics Research, vol. 28, No. 1, pp. 20-33, 2009.

W. Churchill and P. Newman, "Practice makes perfect? managing and leveraging visual experiences for lifelong navigation," in Robotics and Automation (ICRA), 2012 IEEE International Conference on. IEEE, 2012, pp. 4525-4532.

D. Meyer-Delius, M. Beinhofer, and W. Burgard, "Occupancy grid models for robot mapping in changing environments." in AAAI, 2012.

F. Dellaert, "Monte carlo em for data-association and its applications in computer vision," Ph.D. dissertation, Carnegie Mellon University Pittsburgh, PA, 2001.

J. Neira and J. D. Tard'os, "Data association in stochastic mapping using the joint compatibility test," IEEE Transactions.

* cited by examiner

SYSTEM AND METHOD FOR ONLINE PROBABILISTIC CHANGE DETECTION IN FEATURE-BASED MAPS

CROSS-REFERENCE TO RELATED APPLICATIONS

This application claims benefit of U.S. Provisional Application No. 62/559,007, filed on, Sep. 15, 2017, which is herein incorporated by reference in its entirety.

TECHNICAL FIELD

The subject matter described herein relates in general to a system and method for performing change detection in a feature-based map and, more particularly, to using a probabilistic approach that is based, at least part, on current and previous measurements to provide a joint estimate of the existence of features in a map.

BACKGROUND

Autonomous vehicles may be equipped with many sensors that allow the vehicles to perceive other vehicles, obstacles, and pedestrians in the environment. Moreover, the autonomous vehicles can use information about perceived features in the environment to localize the vehicle. That is, the autonomous vehicle can correlate perceived features (e.g., road markings, terrain, etc.) with mapped features to determine a position within the environment. Accordingly, a static feature-based map that includes position information for the mapped features can be used as a basis for comparison to perform the localization. However, as aspects of an environment change from construction or other causes, the changes can cause difficulties with localizing the vehicle according to the feature map.

SUMMARY

In one embodiment, example systems and methods relate to a manner of probabilistic change detection for identifying the persistence of features within a feature-based map. For example, in one approach, a change prediction system uses information from a feature-based map when localizing a vehicle within an environment. Moreover, as part of this process, the change prediction system also leverages sensor data that is collected about features in the environment to, for example, check whether changes have occurred between perceived data and the map. In general, the change prediction system collects sensor data about the features via one or more sensors integrated with the vehicle. Thus, the sensor data embodies a perceived environment around the vehicle. In one embodiment, the sensor data is LIDAR point cloud data. Accordingly, the sensor data includes measurements of features whereas the map generally indicates pose information in relation to, for example, additional features/landmarks.

Accordingly, the change prediction system, in one embodiment, in response to acquiring the sensor data, analyzes the sensor data to initially identify various features in the surrounding environment and correlate the features with features in the map to provide for localizing the vehicle. Moreover, the change prediction system, in one embodiment, uses the associations with the features and also between the features to compute persistence likelihoods of the features. In one aspect, the change prediction system uses a persistence model that characterizes aspects of the present observations of the features as embodied in the sensor data with past observations as provided for in the map or as previously directly observed to compute the persistence likelihoods. Thereafter, the change prediction system applies the persistence likelihoods to update the map and/or to adjust the operation of various vehicle systems (e.g., path planning) to account for features that are changed (i.e., determined to no longer exist). In this way, the change prediction system improves a manner of identifying likely changes in the environment through referencing past observations and relationships between features and, thus, improves the functioning of the vehicle through updated maps for path planning and other functions.

In one embodiment, a change prediction system for identifying changes within a surrounding environment of a vehicle is disclosed. The change prediction system includes one or more processors and a memory communicably coupled to the one or more processors. The memory storing a sensor module including instructions that when executed by the one or more processors cause the one or more processors to collect, using at least one sensor of the vehicle, sensor data about the surrounding environment. The sensor module includes instructions to analyze the sensor data to identify features of the surrounding environment. The features are landmarks of the surrounding environment that are indicated within a map of the surrounding environment. The sensor data indicates at least measurements associated with the features as acquired by the at least one sensor. The memory storing a prediction module including instructions that when executed by the one or more processors cause the one or more processors to compute persistence likelihoods for the features according to a persistence model that characterizes at least prior observations of the features and relationships between the features. The persistence likelihoods indicate estimated persistences of the features to identify whether the features exist. The prediction module includes instructions to control the vehicle according to the persistence likelihoods.

In one embodiment, non-transitory computer-readable medium for identifying changes within a surrounding environment of a vehicle and including instructions that when executed by one or more processors cause the one or more processors to perform one or more functions. The instructions include instructions to collect, using at least one sensor of the vehicle, sensor data about the surrounding environment. The instructions include instructions to analyze the sensor data to identify features of the surrounding environment. The features are landmarks of the surrounding environment that are indicated within a map of the surrounding environment. The sensor data indicates at least measurements associated with the features as acquired by the at least one sensor. The instructions include instructions to compute persistence likelihoods for the features according to a persistence model that characterizes at least prior observations of the features and relationships between the features. The persistence likelihoods indicate estimated persistences of the features to identify whether the features exist. The instructions include instructions to control the vehicle according to the persistence likelihoods.

In one embodiment, a method for identifying changes within a surrounding environment of a vehicle is disclosed. The method includes collecting, using at least one sensor of the vehicle, sensor data about the surrounding environment. The method includes analyzing the sensor data to identify features of the surrounding environment. The features are landmarks of the surrounding environment that are indicated within a map of the surrounding environment. The sensor data indicates at least measurements associated with the features as acquired by the at least one sensor. The method includes computing persistence likelihoods for the features according to a persistence model that characterizes at least prior observations of the features and relationships between the features. The persistence likelihoods indicate estimated persistences of the features to indicate whether the features likely still exist. The method includes controlling the vehicle according to the persistence likelihoods.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
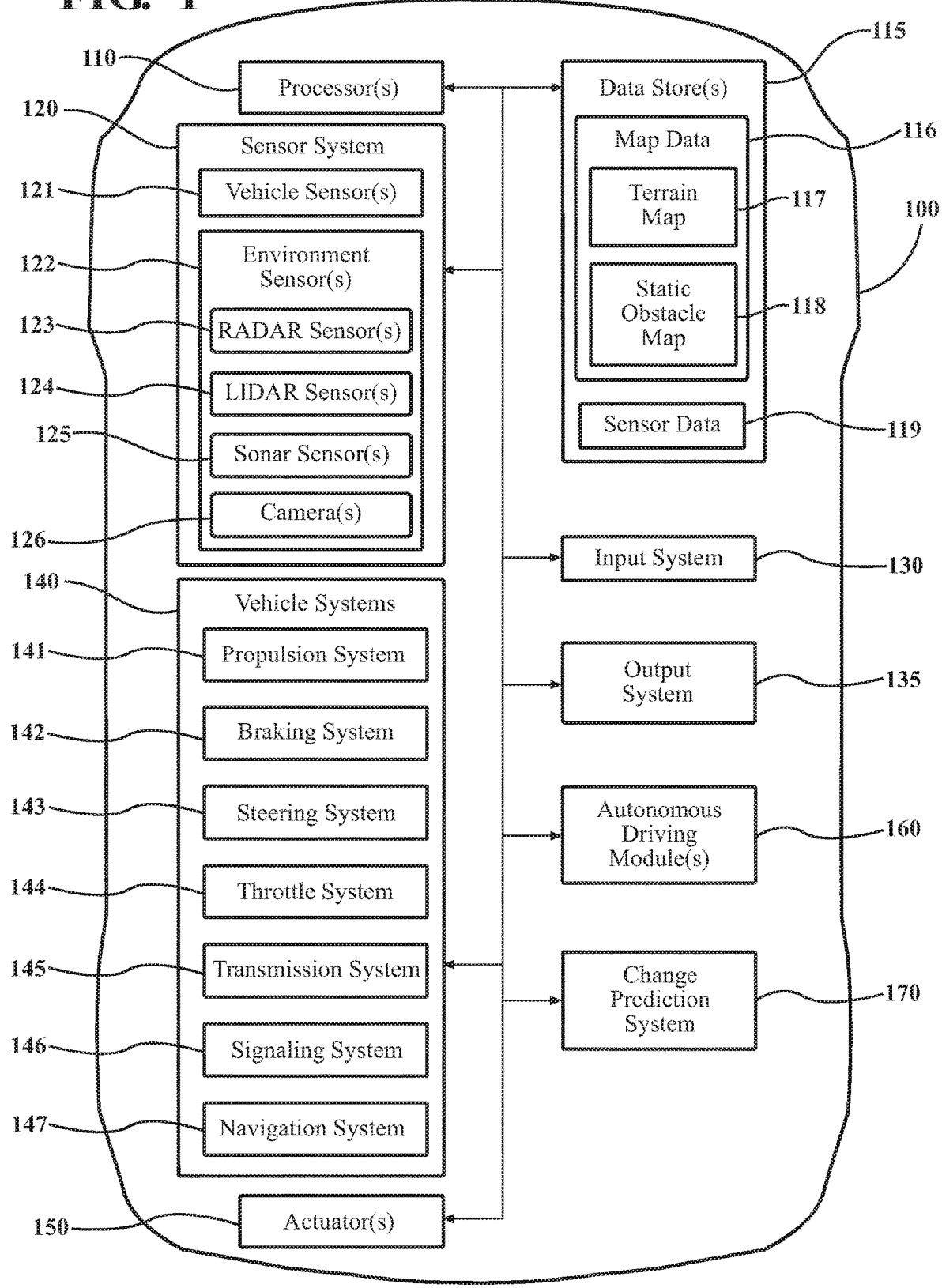
FIG. 1 illustrates one embodiment of a vehicle within which systems and methods disclosed herein may be implemented.

Systems, methods and other embodiments associated with feature persistence using a probabilistic approach are disclosed. As mentioned previously, an autonomous vehicle or other device can use sensor data from, for example, a LIDAR to detect features in a surrounding environment and, for example, localize the vehicle through comparisons with a feature-based map. In general, the autonomous vehicle achieves this mapping/localization by using sensors to detect the features in the environment. However, as previously noted, various difficulties can complicate the noted mapping and localization. For example, when aspects of the environment change or transient objects occlude aspects of the environment, difficulties with precisely localizing the vehicle and/or accurately defining the features of the map can occur.

Therefore, in one embodiment, a change prediction system uses a probabilistic approach to provide a prediction about whether a feature has changed or is unchanged. Thus, the change prediction system can predict whether a feature is persistent or not according to previous and current observations by a sensor (e.g., LIDAR). In this way, likely changes to features in the environment can be dynamically determined thereby improving data associations, global localization, and maintaining updated representations of the surrounding environment, i.e., an updated map.

Thus, in one embodiment, the change prediction system implements a feature-based model of the environment which evolves over time and exploits correlations between features to estimate a joint posterior over feature existence. Moreover, in one or more embodiments, the change prediction system is implemented to streamline the noted estimation process through using approximations to allow for online estimation of the joint existence belief in a Bayesian framework. This approach permits the change prediction system to compute the belief over individual existence of a feature at any point in time. By incorporating knowledge about the existence of a feature into localization and mapping techniques, the change prediction system is able to improve functional aspects of the vehicle that rely on the feature-based mapping. In this way, the change prediction system implements a probabilistic formulation on feature persistence that takes into account correlations between features using persistence to inform data associations and improve localization.

In one embodiment, the change prediction system disclosed herein takes into account correlations between features using a persistence model for feature-map persistence. Moreover, in one embodiment, the change prediction system computes joint feature persistence (e.g., persistence likelihood) incrementally and in constant time to facilitate online (i.e., real-time) operation. In further aspects, the change prediction system implements a data structure for the correlations between features within the feature-based map that captures underlying environmental structure.

The discussion of the change prediction system will proceed by first providing a general overview of the derivation for the present approach followed by explanation of particular embodiments. Accordingly, for performing the disclosed approach, quantities of interest (i.e., electronic inputs) include, for example, pose in time and positions of map features. The noted quantities are represented by the state vector $X=[x_p, x1_{1:M}]$ where $x_p$ are the poses and $x1$ are the M map features. Given a set of sensor measurements Z, the Maximum-a-Posteriori (MAP) SLAM problem is to maximize the posterior $p(X|Z)$. However, this approach can be inefficient since summing over all possible data associations is to be executed. Letting J be the vector of all data association hypothesis, the disclosed system can estimate the optimal data association vector $\arg\max J\, p(J|Z)$; however, the difficulty in evaluating the likelihood of a spurious measurement (i.e. the likelihood of seeing a new feature) can make this approach undesirable.

Moreover, in one approach the change prediction system solves for data associations with a search over possible associations, using techniques such as Joint Compatibility Branch and Bound (JCBB) and then conditions the state estimate on data associations: $p(X|Z, J)$ where J is the vector of data associations that assign a feature in the state vector to a measurement. Allowing features to have an associated "survival time," an additional set of discrete random variables $\Theta^t \in \{0, 1\}$ is provided, which represent if a feature exists at a specified time t. In another approach, the data associations are jointly estimated along with feature persistence $p(J, \Theta)$. However, this approach may be inefficient. Therefore, disclosed systems and methods implement a further approach to estimating the state vector X and condition the feature persistence on the output of the data association step $p(\Theta^t|J)$. In one embodiment, this is achieved by first estimating J using a data association technique such as joint compatibility branch and bound (JCBB), which is then used to estimate $\Theta$.

The disclosed system and methods generally follow a survivability formulation, which will be briefly described. Each feature i in a map has a latent "survival-time" $T_i \in [0,$ ∞), which represents the time when feature i cease to exist, as well as a persistence variable $\Theta^t_i$:

$$T_i \sim p_{T_i}(\bullet) \quad (1)$$

$$\theta^t_i | T_i = \begin{cases} 1, t \leq T_i \\ 0, t > T_i \end{cases},$$

where $\Theta^t_i$ is a boolean random variable representing whether feature i exists at time t, and $p_{T_i}(\bullet)$ encodes some prior distribution over the survival time $T_i$. Estimating for each feature i a marginal persistence probability $p(\Theta^t_i=1 | J^{1:N})$ where $J^{1:N}$ are all the feature detections collected until time $t_N$. Note that for a map with M features $J^{1:N} = \{J_1^{1:N}, \ldots, J_M^{1:N}\}$ with $J_k^{1:N} = \{j_k^{t_i}\}_{i=1}^N$, $k \in [1, M]$, $j \in [0, 1]$. The feature detections are the output of the data-association determination, indicating if feature k was detected at time $t_i$. The disclosed systems and methods estimate the full joint feature persistence posterior at a certain time t, given all data association decisions from time $t_1$ to $t_N$:

$$p(\theta^t=1|J^{1:N}), \quad (2)$$

where $\Theta^t$ is the joint persistence over all M map features $\Theta^t = \{\Theta_1^t, \ldots, \Theta_M^t\}$ at time $t \in [t_N, \infty)$. Thus, the system and methods are focused on estimating the joint posterior probability over feature existence in the present and future, given the sequence of detections for all features. It should be noted that estimating the persistence probability is performed for times equal to or greater than the last received measurement $t_N$. Noting that $p(\Theta t=1 \, J^{1:N}) = p(T \geq t | J^{1:N})$, with $T = \{T_i\}_{i=1}^M$ the vector of survival times for all M map features and using Bayes' Rule to compute the posterior probability in equation (2)

$$p(\theta^t = 1 | J^{1:N}) = \frac{p(J^{1:N} | T \geq t)p(T \geq t)}{p(J^{1:N})}. \quad (3)$$

The following provides a closed-form expression for evaluating the joint posterior terms, starting with the joint detection likelihood $P(J^{1:N}|T \geq t)$. A sequence of detections $J^{1:N}$ of feature i are modeled to depend, for example, only on feature i; that is, $p(J_i^{1:N}|T \geq t) = p(J_i^{1:N}|T_i \geq t)$ $$p(J^{1:N} | T \geq t) = \prod_{i=1}^{M} p(J_i^{1:N} | T_i \geq t) \quad (4)$$

$$= \prod_{i=1}^{m} \prod_{k=1}^{n} p(j_i^{t_k} | T_i \geq t),$$

The methods and systems disclosed herein further assume that the sequence of detections $\{j^{t1}, j^{t2}, \ldots j^{tm}\}$ for feature i are conditionally independent from other detections, given the persistence $\Theta^t_i$. The intuition behind this is that given existence of a feature, its sequence of detections should not depend on other features. We are still left with evaluating the individual measurement likelihood $P(j^t_i|T_i)$, which is the probability of detecting a feature given the survival time $T_i$. Defining a probability of missed detections $P_M$ and a probability of false alarm $P_F$. Using the model defined in equation (1)

$$p(j^t_i | T_i) = \begin{cases} P_M^{(1-j^t_i)}(1-P_M)^{j^t_i}, & T_i \geq t \\ P_F^{(j^t_i)}(1-P_F)^{1-j^t_i}, & T_i < t \end{cases}, \quad (5)$$

where $P_M$ models the probability that the feature exists but was not detected, and $P_F$ models the probability that the feature no longer exists but was detected, which may happen due to, for example, incorrect data associations or spurious measurements. The noted quantities are dependent on a series of factors such as the amount of clutter in the environment, the data-association process, and therefore the state uncertainty. $P_M$ and $P_F$ are provided as constants, but they could be modified per observation, e.g., to include occlusions.

One aspect of the disclosed systems and methods includes modeling of $p(\Theta^t)$, the joint prior distribution over feature persistence (at time t). In many environments, the existence of one feature is correlated to the existence of other features and, thus, the disclosed systems and methods exploit that correlation. In one approach, the disclosed systems and methods impose some structure to the environment (e.g. a feature drawn from a curb in the road is not affected if a sign-post is removed, however, it strongly correlates to other features in the same curb). Accordingly, the complexity of computing the joint prior is bounded by the maximum number of correlated features. Such structure is justified by the intuition that the existence of a feature is, for example, only strongly correlated to a subset of the map.

Thus, the present systems and methods exploit structure of the environment to leverage the correlation between features while still maintaining a tractable posterior. Imposing some structure on the feature map such that there exists a set of $L \leq M$ cliques $\{\tau_i\}_{i=1}^L$, with $\tau_i^t \subset \Theta^t$ and features $z \in \tau$, the joint posterior factors into $$p(\theta^t) \approx \prod_{i=1}^{L} p(\tau^t_i). \quad (6)$$

Given the assumption that features associated in a clique $\tau_i$ have strongly correlated persistence, the joint prior $p(\tau_i^t)$ can be approximately decomposed into:

$$p(\tau^t_i) \approx \prod_{\zeta \in \tau} p(\theta^t_\zeta | (\theta^t_k)) = \prod_{\zeta \in \tau} p(T_\zeta | T_k \geq t) \forall k \in \tau, \quad (7)$$

which states that for any feature k in a clique $\tau_i$, the joint distribution $p(\tau_i)$ can be approximately factored into a product of conditional distributions on feature $z_k \in \tau_i$. The intuition behind this approximation is that for a set of correlated features (e.g., a set of features all drawn from the same rigid body), conditioning on a single feature from that rigid body adds approximately the same amount of information as conditioning on all the features. The conditional prior $p(Tz|Tk \geq t)$ is defined as $$p(T_\zeta | T_k \geq t) \triangleq \begin{cases} \pi_\zeta p(T_\zeta < t_i) & t_i < t \\ \pi_\zeta p(T_\zeta \geq t_i) + \pi_k & t_i \geq t \end{cases}, \quad (8)$$

with pairwise weights associated to each feature pair in $\tau_1$. $P(J^{1:N})$ is the marginal measurement probability or joint evidence. We can leverage the fact that the detection likelihood is constant in the intervals between detections, the factorization of the full joint into L cliques and a way to evaluate the cumulative distribution function of the survival time prior $p(T \le t) = F_T(t)$, where $F_T(t)$ is the cumulative distribution function of the survival time prior to derive a closed-form expression for the evidence; defining $t_0 = 0$ and $t_{N+1} = \infty$ $$p(J^{1:N}) = \prod_{i=1}^{L} p(J_{\tau_i}^{1:N}) \qquad (9)$$

$$= \prod_{i=1}^{m} \left( \prod_{\zeta \in \tau_i}^{n} \left( \sum_{u=0}^{N} p(J_{\zeta}^{1:N} | t_u) \int_{t_u}^{t_{u+1}} p(T_{\tau_i}) \right) \right),$$

decomposing the full joint evidence into the product of the cliques $\tau_i$, then further decomposing each clique into the product of its individual terms, which are tied together by the joint prior $P(T_{\tau_i})$. Each conditional prior can be evaluated according to equation (8).

The marginal persistence for a feature a which is correlated to another feature b, given a sequence of N detections $J_a^{1:N}$, $J_b^{1:N}$ from time $t \in [t_1, t_N]$. The following reduction is provided therefrom:

$$p(\theta_a^t = 1 | J_a^{1:N}, J_b^{1:N}) = p(T_a \ge t | J_a^{1:N}, J_b^{1:N}) \qquad (10)$$

$$= \int_0^\infty p(T_a \ge t, T_b | J_a^{1:N}, J_b^{1:N}) dT_b$$

$$= \int_0^\infty \frac{p(J_a^{1:N}, J_b^{1:N} | T_a \ge t, T_b) \cdot p(T_a \ge t, T_b)}{p(J_a^{1:N}, J_b^{1:N})} dT_b$$

$$= \frac{p(J_a^{1:N} | t_N) p(T_a \ge t)}{p(J_a^{1:N}, J_b^{1:N})} \times$$

$$\int_0^\infty p(J_b^{1:N} | T_b) p(T_b | T_a \ge t) dT_b,$$

using the fact that $p(J^{1:N} T)$ is constant in the intervals $[t_i, t_i+1]$ to define the integral in (10) as $$\int_0^\infty p(J_b^{1:N} | T_b) p(T_b | T_a \ge t) dT_b = \qquad (11)$$

$$\sum_{i=0}^{N} p(J_b^{1:N} | t_i) \int_{t_i}^{t_{i+1}} p(T_b | T_a \ge t) dT_b.$$

Note that in the case where features a and b are independent, $p(Tb|Ta \ge t) = p(Tb)$ and (11) simply becomes the marginal $p(J_b^{1:N})$ which cancels part of the evidence in (10); this results in the posterior.

Now consider the weights $\pi$ of equation (8). Since there is no inherent structure to the sparse feature-based environmental representation, the system implements a prior structure that aims to capture the underlying structure of the environment. Thus, this approach models features which were observed at a similar point in time, and are physically close to have correlated persistence. The intuition is that if a set of features is co-observed and geometrically close, the likelihood that they belong to the same semantic object (e.g. lane markings, sign post) is high. Accordingly, the system defines the set N of all features that were observed within $\Delta s$, and within that set the system employs a Euclidean nearest neighbors metric to group features in cliques of up to n=5 features, which are within a maximum distance dmax to the center of the clique. When applied to sparse feature-based maps in which clutter is reduced this method is a general way of capturing the underlying scene structure. The weights 7 between features are then computed as the inverse Euclidean distance $$\pi_{ij} = \frac{1}{\|\hat{x}_i - \hat{x}_j\|}, \qquad (12)$$

Computing the set of cliques and their corresponding weights can, for example, be performed offline.

Computing both the joint distribution $P(\Theta^t | J^{1:N})$ and the marginal $P(\Theta_i^t | J^{1:N})$ in a recursive manner by re-using previously computed terms will now be described. This allows the change prediction system to, in one embodiment, perform a constant-time update when a new detection is received. When a new observation $j^{t_{N+1}}$ is appended to the observation vector $J^{1:N}$ $t_{N+1} > t_N$ and given the independence assumption in equation (4), the updated joint detection likelihood is $$p(J^{1:N+1} | T \ge t) = \prod_{i=1}^{M} \prod_{k=1}^{N+1} p(j_i^{j_k} | T_i \ge t). \qquad (13)$$

The updated joint detection likelihood at time $t_{N+1}$ can be written in terms of the previous at time $t_N$ $$p(J^{1:N+1} | T \ge t) = p(J^{1:N} | T \ge t) \prod_{i=1}^{M} p(j_i^{N+1} | T_i \ge t). \qquad (14)$$

Using the decomposition of the joint prior distribution in equation (7) where we have L cliques $\tau_i$, when a new measurement at $t_{N+1}$ is observed, the updated joint evidence is computed as $$p(J^{1:N+1}) = \prod_{i=1}^{L} p(J_{\tau_i}^{1:N+1}). \qquad (15)$$

If a clique $\tau_k$ has $\tau_M$ features the clique evidence $p(J_{\tau k}^{1:N})$ can be computed as $$p(J_{\tau_k}^{1:N}) = \sum_{i=0}^{N-1} p(J_{\tau_k}^{1:N} | t_i) p(t_{i-1} \le T_{\tau_k} < t_i) + p(J_{\tau_i}^{1:N} | T_{\tau_i} \ge t_N), \qquad (16)$$

which implies that the updated partial evidence, which excludes the last term in the sum where the survival time is $T_{N+1}$ after incorporating the measurement at time $t_{N+1}$ is $$p_L(J_{\tau_k}^{1:N+1}) \triangleq \left[\left(\sum_{i=0}^{N-1} p(J_{\tau_k}^{1:N} \mid t_i)p(t_{i-1} \leq T_{\tau_k} < t_i)\right) + \right.$$

$$\left.(p(J_{\tau_k}^{1:N} \mid t_N)p(t_N \leq T_{\tau_k} < t_{N+1}))\right] \times \prod_{i=1}^{\tau_M} p(j_i^{N+1} \mid T_i < t_{N+1}). \quad (17)$$

The full updated joint evidence can be obtained by combining the partial evidence from equation (17) with the measurement probability given feature survival times at time $T=t_{N+1}$ $$p(J_{\tau_k}^{1:N+1}) = p_L(J_{\tau_k}^{1:N+1}) + \prod_{i=1}^{\tau_M} p(j_i^{N+1} \mid T_i \geq t_{N+1}). \quad (18)$$

The updated joint distribution can thus be computed for each clique $\tau_i$ using equations (13), (15) and computing the prior using equation (7). The marginal persistence probability can be updated in an analogous manner and is omitted for purposes of brevity.

Referring to FIG. 1, an example vehicle 100 is illustrated within which the disclosed systems and methods may be implemented. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any robotic device or form of motorized transport that, for example, can operate/navigate at least semi-autonomously and/or can indicate contextual information to an operator/driver, and thus benefits from the functionality discussed herein.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-5 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the vehicle 100 includes a change prediction system 170 that is implemented to perform methods and other functions as disclosed herein relating to improving detection of changes in a feature-based map. The noted functions and methods will become more apparent with a further discussion of the figures.

Figure 2:
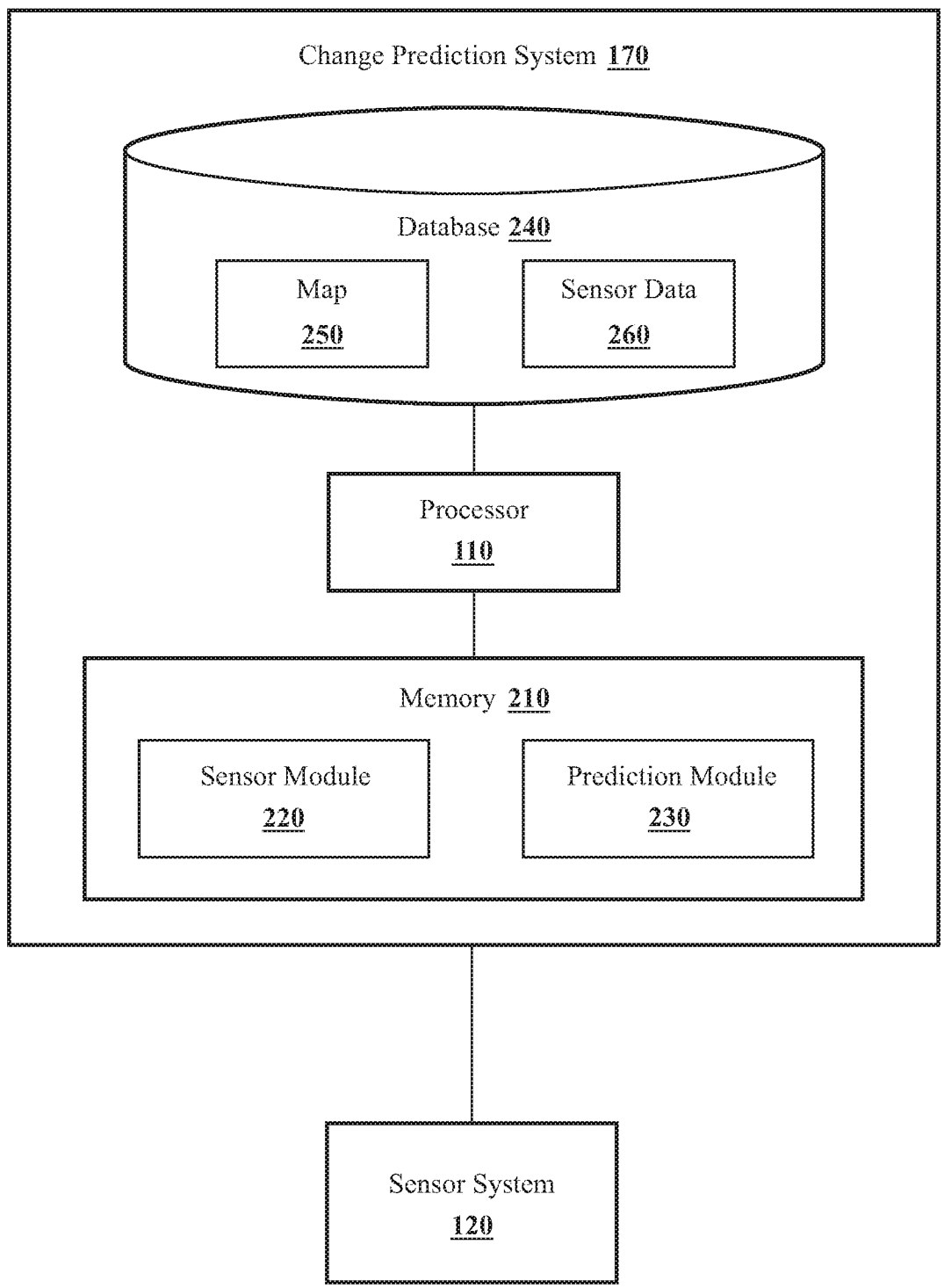
FIG. 2 illustrates one embodiment of a change prediction system that is associated with determining the persistence of features in a map.

With reference to FIG. 2, one embodiment of the change prediction system 170 of FIG. 1 is further illustrated. The change prediction system 170 is shown as including a processor 110 from the vehicle 100 of FIG. 1. Accordingly, the processor 110 may be a part of the change prediction system 170, the change prediction system 170 may include a separate processor from the processor 110 of the vehicle 100, or the change prediction system 170 may access the processor 110 through a data bus or another communication path. In one embodiment, the change prediction system 170 includes a memory 210 that stores a sensor module 220 and a prediction module 230. The memory 210 is a random-access memory (RAM), read-only memory (ROM), a hard-disk drive, a flash memory, or other suitable memory for storing the modules 220 and 230. The modules 220 and 230 are, for example, computer-readable instructions that when executed by the processor 110 cause the processor 110 to perform the various functions disclosed herein.

Accordingly, the sensor module 220 generally includes instructions that function to control the processor 110 to receive sensor data 260 from one or more sensors (e.g., LIDAR 124, camera 126) of the vehicle 100. The inputs are, in one embodiment, observations of one or more objects in an environment proximate to the vehicle 100 and/or other aspects about the surroundings. Subsequently, the sensor module 220 can detect surrounding vehicles/objects using the sensor data 260. In general, the sensor data 260 includes measurements of the features in relation to a pose of the vehicle 100. Thus, in one embodiment, the sensor module 220 associates the measurements with a known existing feature (e.g., from a sparse feature-based map) or adds a new feature for the measurement. In one embodiment, the sensor module 220 detects features of a surrounding environment (e.g., road lane markers, terrain, buildings, curbs, signs, etc.) and provides the features to a prediction module 230.

Moreover, in one embodiment, the change prediction system 170 includes the database 240. The database 240 is, in one embodiment, an electronic data structure stored in the memory 210 or another data store and that is configured with routines that can be executed by the processor 110 for analyzing stored data, providing stored data, organizing stored data, and so on. Thus, in one embodiment, the database 240 stores data used by the modules 220 and 230 in executing various functions. In one embodiment, the database 240 includes the feature-based map 250 along with, for example, sensor data 260 and or other information that is used by the module 230. For example, the database 240 can include location coordinates (e.g., longitude and latitude), relative map coordinates or tile identifiers, time/date stamps from when the separate sensor data 260 was generated, and so on.

Moreover, the feature-based map 250 may include various data structures storing location information, data association information, and so on for various features in the surrounding environment. The feature-based map 250 is, for example, a sparse feature-based map. In one embodiment, the feature-based map 250 is implemented to include features from the surrounding environment that implement structure into the map 250. That is, the map 250 is implemented such that features included within the map are features that generally correlate through the inherent characteristics of those features. For example, the map 250 can be populated with features such as curbs, lane markers, power lines, and other features that are intrinsically related and thus exhibit, for example, interdependencies (e.g., subsequent segments of curb/power line/lane markers are connected and are thus generally modified together). By including such features within the map 250 changes occurring within the surrounding environment can generally be tracked between the features. That is, because changes to a lane in a road affect all of the lane markers for that lane, the changes generally correlate between the features, and, thus, this structure can inform determinations about whether features have changed. Additionally, in further embodiments, the database 240 and/or the memory 210 store the feature-based map 250 in various portions.

In one embodiment, the prediction module 230 generally includes instructions that function to control the processor 110 to predict changes within features of the feature-based map by generating persistence likelihoods for the features that indicate whether the features still exist. Moreover, while the feature-based map 250 is discussed as being stored in the database 240, in one or more embodiments, the feature-based map 250 is at least partially stored in a cloud-storage that is connected with the vehicle 100 via a communications link. In either case, the prediction module 230 implements various computational logic to analyze information provided via the sensor module 220 about the surrounding environment by computing the persistence likelihoods for the features in order to determine when changes to the feature-based map 250 have occurred.

In one embodiment, the change prediction system 170 is configured in a manner so as to determine the changes according to a series of observations and provide the predictions to additional aspects of the vehicle 100 such as the autonomous driving module 160. In further aspects, the prediction system 170 controls aspects of the vehicle 100 directly such as controlling the vehicle 100 to execute an emergency maneuver (e.g., pullover) and/or to render visual display alerts or audible alerts to occupants of the vehicle 100. Moreover, the change prediction system 170, in one embodiment, provides indications of the changes to a cloud-based service in order to report the changes for use by other vehicles/robots. In this way, the change prediction system improves the operation of the vehicle 100 by improving localization, planning, and execution of maneuvers, improving the operation of one or more computers through more efficient navigation, improving safety through better awareness of possible obstacles, and so on.

Figure 3:
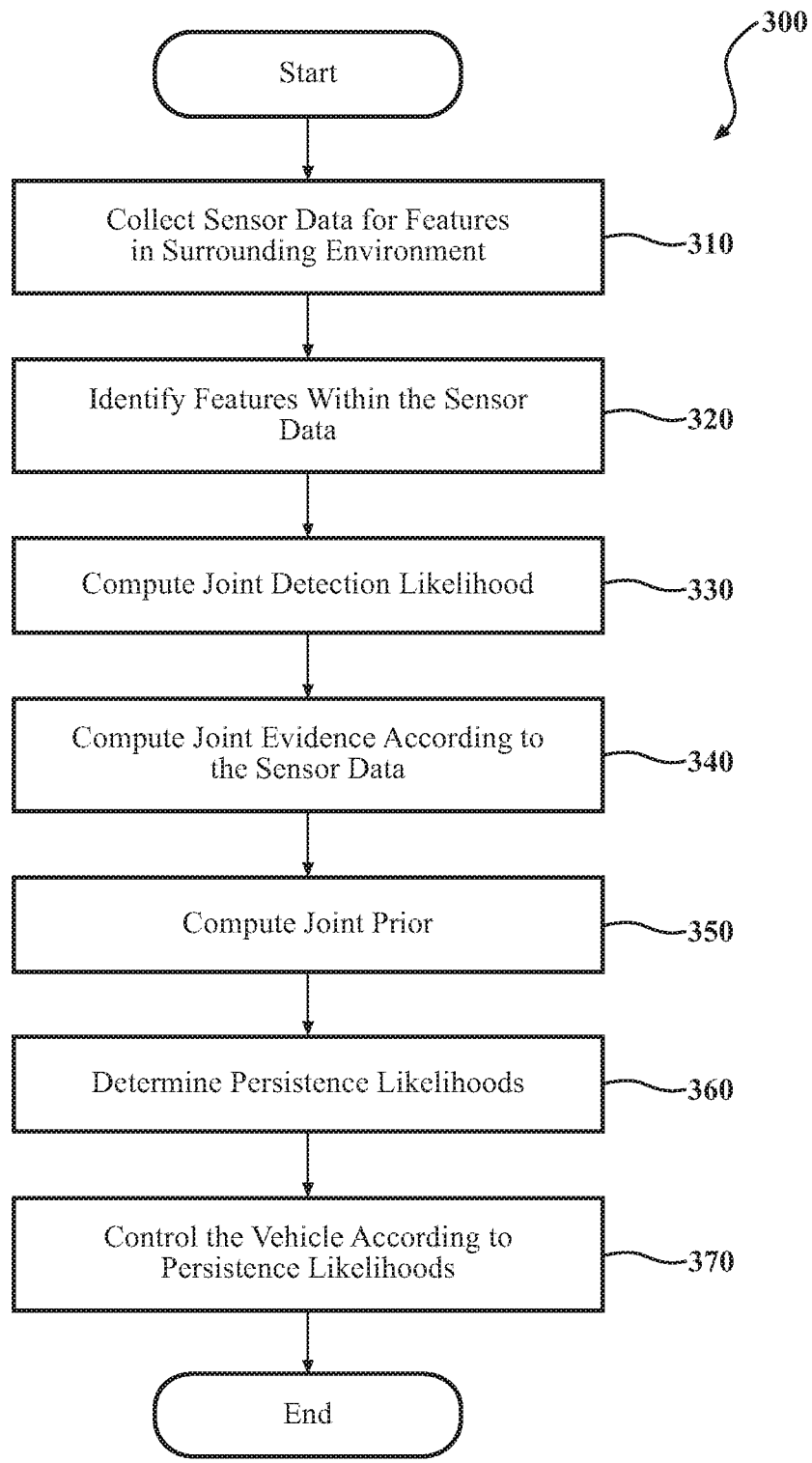
FIG. 3 illustrates one embodiment of a method for probabilistic change detection of a feature-based map.

Additional aspects of determining the persistence/existence of features within a surrounding environment will be discussed in relation to FIG. 3. FIG. 3 illustrates a flowchart of a method 300 that is associated with determining persistence likelihoods for features in a surrounding environment to, for example, detect changes. Method 300 will be discussed from the perspective of the change prediction system 170 of FIGS. 1, and 2. While method 300 is discussed in combination with the change prediction system 170, it should be appreciated that the method 300 is not limited to being implemented within change prediction system 170, but is instead one example of a system that may implement the method 300.

At 310, the sensor module 220 collects the sensor data 260 about the surrounding environment. It should be noted, that while the sensor module 220 is discussed as collecting the sensor data 260 at a single point, in various embodiments, the sensor module 220 collects the sensor data 260 on a constant basis, at discrete update points (e.g., every 0.1 seconds), and/or in another continuous or at least semi-continuous manner. In general, the sensor data 260 is collected in order to provide situational awareness to the vehicle 100 for purposes of navigating, avoiding objects, and so on. Thus, the collecting at 310 is generally implemented to provide a continuous stream of the sensor data 260 in order to maintain an up-to-date perception of the surrounding environment. For purposes of this discussion, the various aspects of the method 300 are discussed in a serial manner and as being discrete. However, it should be appreciated that in various implementations the noted functional blocks are executed in parallel and in a constant time updating manner so as to provide a continuously updated awareness of the surrounding environment.

Moreover, the sensor module 220 can leverage one or more different sensors for collecting the sensor data. As illustrated in FIG. 1, the vehicle 100 includes many different sensors in the sensor system 120. Thus, the sensor module 220 can control the radar sensor 123, the lidar sensor 124, the camera 126, and/or other sensors that are not explicitly illustrated as part of the sensor system 120 in order to collect the sensor data 260.

At 320, the sensor module 220 analyzes the sensor data 260 to identify features of the surrounding environment. As previously indicated, the features are landmarks or other aspects of the surrounding environment that are indicated within the map 250. In one embodiment, the features may be pre-existing within the map 250 or added to the map 250 when initially detected. In further aspects, the map 250 is generated in real-time according to a SLAM approach. In either case, the sensor module 250 analyzes the data using a data association decision algorithm such as a joint compatibility branch and bound (JCBB) approach or another suitable approach to correlate the measurements of the sensor data with the features. In this way, the sensor module 220 can identify the features within the surrounding environment. In further aspects, the sensor module 220 may additionally or alternatively execute image recognition or other techniques to identify the features. In either case, the general approach identifies the features to generate data associations between the sensor data and the features such that the persistence model can be applied to the data associations to determine the persistence likelihoods.

At 330, the prediction module 230 computes a joint detection likelihood from the present data associations determined at 320 in addition to, for example, previous observations of the feature. Thus, the prediction module 230 computes the joint detection likelihood to indicate probabilities that the features are detected within the sensor data given that the features actually exist. The prediction module 230 uses the noted data associations as inputs to the persistence model as explained previously in relation to equations (3)-(5), (13) and (15).

At 340, the prediction module 230 computes a joint evidence of the features. In general, the joint evidence indicates a marginal measurement probability that includes accounting for the measurements for the features from the sensor data 260 along with past measurements for the features. Thus, in one embodiment, the prediction module 230 computes the joint evidence according to the persistence model and, more specifically, according to equations (9)-(11) of the persistence model.

At 350, the prediction module 230 computes a joint prior distribution for the features. The joint prior distribution (also referred to as the joint prior) characterizes whether the features have been detected over a series of scans of the surrounding environment including a scan embodied by the sensor data 260. Moreover, the prediction module 230 computes the joint prior distribution to account for dependencies between the features in relation to the persistence of the features over time. In general, the joint prior distribution takes into account relationships of features within the environment for which changes may influence those related features. Accordingly, the prediction module 230, in one embodiment, computes the joint prior distribution according to persistence model for equations (6)-(8) as outlined previously. In either case, the prediction module 230 includes the joint prior distribution in order to identify the persistence of a feature through leveraging dependencies between the features.

At 360, the prediction module 230 computes persistence likelihoods for the features according to the persistence model that characterizes at least prior observations of the features and relationships between the features. In one embodiment, the persistence likelihoods are evaluated over the joint detection likelihood, the joint prior distribution, and the joint evidence as computed at blocks 330-350. Thus, the prediction module 230 evaluates the noted aspects using the persistence model as indicated according to equation (3). In general, the persistence likelihoods indicate estimated persistences of the features. That is, the persistence likelihoods indicate a probability of whether the features still exist.

At 370, the prediction module 230 controls the vehicle 100 according to the persistence likelihoods. In one embodiment, the prediction module 230 controls the vehicle 100 by updating the map 250 according to the persistence likelihoods when the persistence likelihoods indicate that at least one of the features is likely not present. In further aspects, the prediction module 230 controls the vehicle 100 by adjusting planning of one or more vehicle systems 140 of the vehicle 100 according to the persistence likelihoods to improve the planning by avoiding references to one of the features that is no longer present. In general, the persistence likelihoods are leveraged by the vehicle 100 to further inform awareness about the surrounding environment. That is, the persistence likelihoods provide for an improved manner of determining whether detected features remain in existence and, for example, correlate with previously mapped features. In this way, the change prediction system 170 can improve the perception of the surrounding environment and by connection also improve aspects that rely on such perception.

Figure 4:
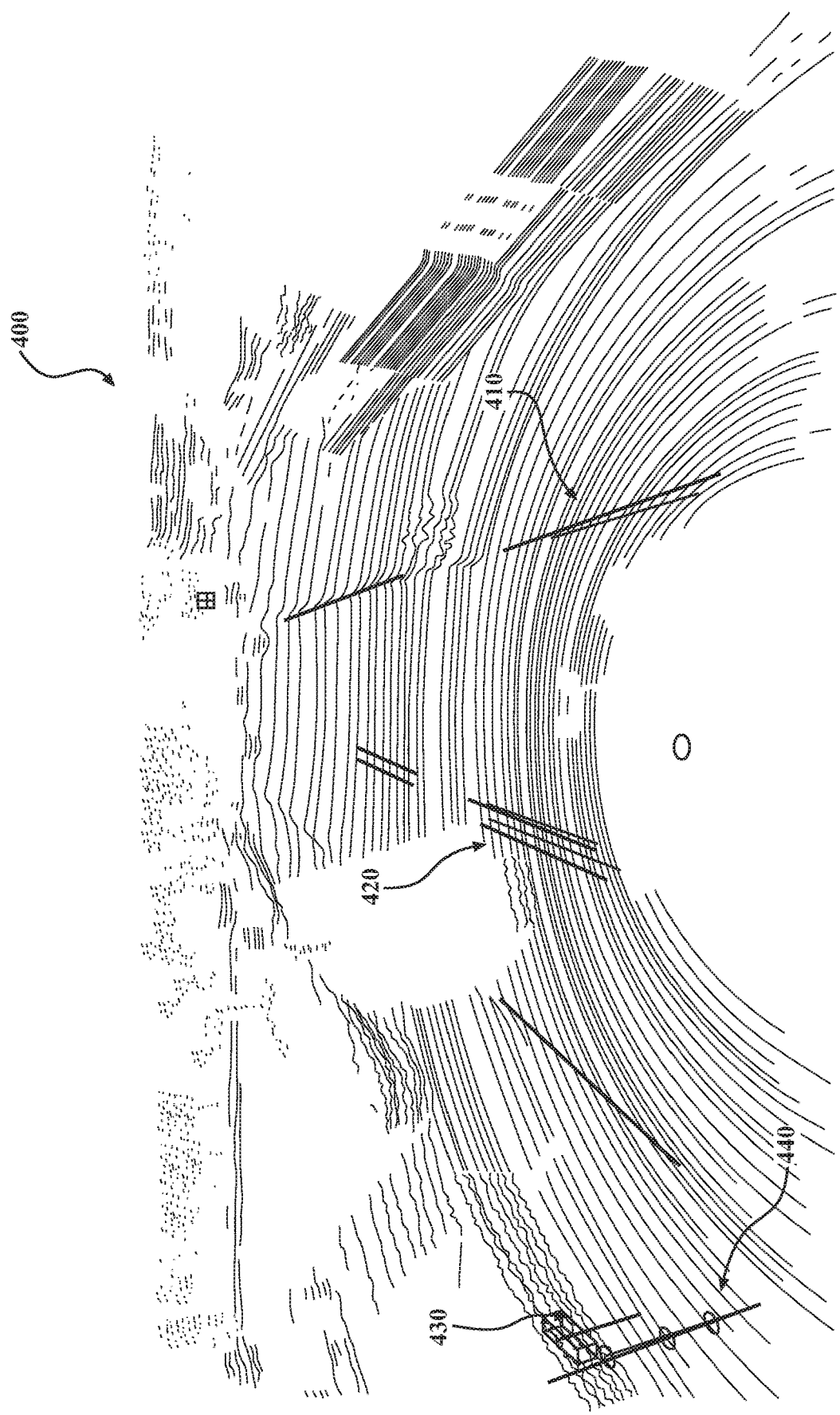
FIG. 4 illustrates an example LIDAR scan return for including detected features therein.
Figure 5:
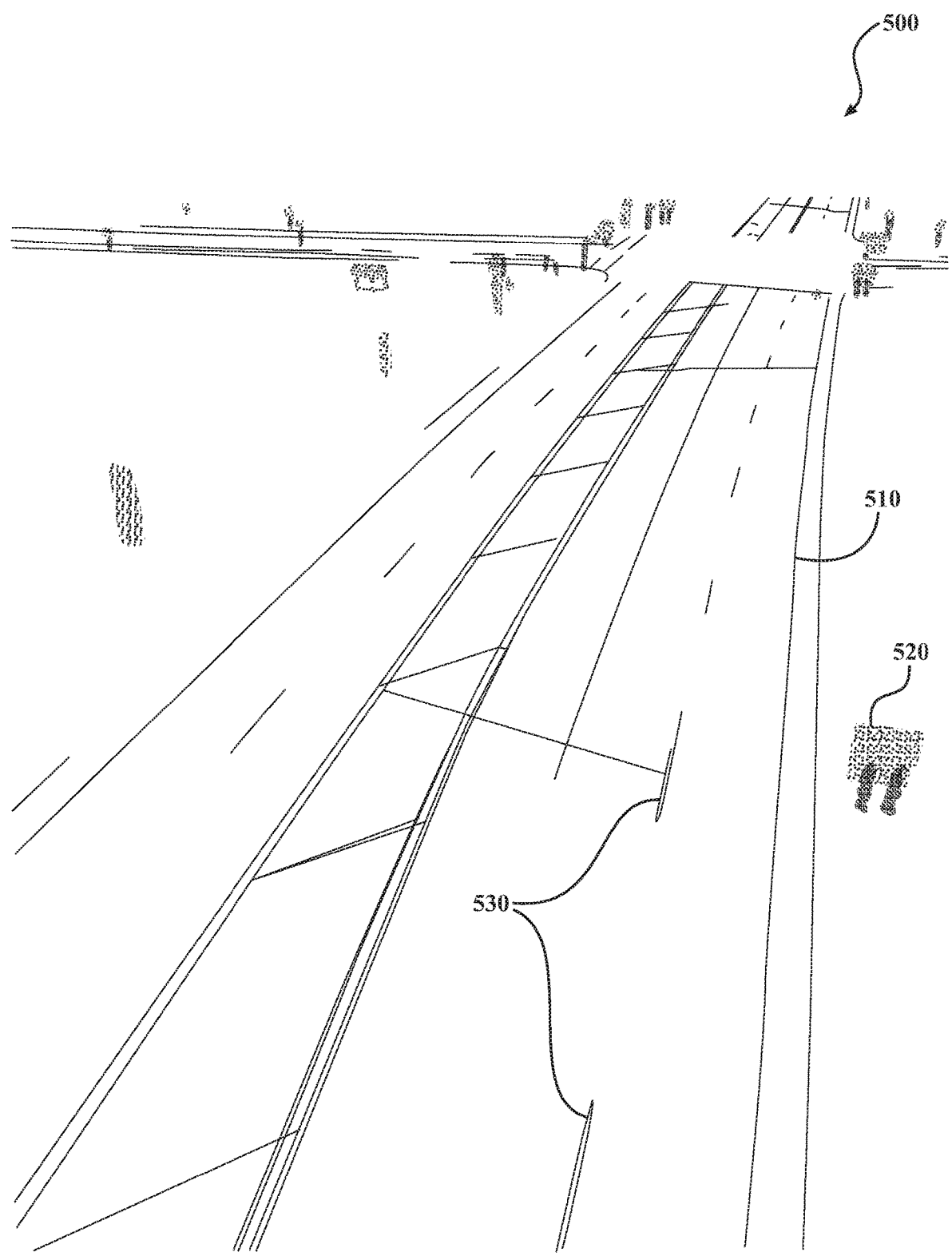
FIG. 5 illustrates an example feature-based map for a particular location.

Further aspects of the change prediction system 170 will be described in relation to FIGS. 4 and 5. FIG. 4 illustrates one example of a scan return 400 from the LIDAR sensor 124 for a surrounding environment of the vehicle 100. As illustrated, the return 400 includes measurements for features such as a curb 410, lane markings 420, sign 430, and poles 440. FIG. 5 illustrates a similar surrounding environment 500 as FIG. 4 except that the features illustrated in FIG. 5 have been extracted from the sensor data. For example, FIG. 5 illustrates a curb 510, a sign 520, and lane markers 530. In either case, both FIGS. 4 and 5 illustrate types of features that included within the map 250. The features are generally aspects of the surrounding environment that correlate in that changes to one feature likely indicates changes to further features that are spatially close and/or related in type.

For example, the curbs 410 are likely to exhibit changes between multiple sections thereof when construction or another change occurs. Similarly, the lane markings 420 are also likely to exhibit changes therebetween. Accordingly, the change detection system 170 is configured in such a way as to leverage the likely correlations in changes between or similarly no changes between the features. By way of example, consider that the vehicle 100 acquires sensor data of the scan return 400. The sensor module 220 processes the sensor data 260 to identify the features 410-440 as correlating with the measurements. The prediction module 230 can then apply the persistence model to the data associations for the features to generate the persistence likelihoods that specify a likelihood of whether the features still exist. Thus, the prediction module 230 generates the joint detection likelihood, the joint prior distribution, and the joint evidence for each of the features to determine the persistence likelihoods.

Moreover, this same analysis is generally undertaken at successive time steps as the vehicle 100 progresses through the surrounding environment. Thus, data associations from the previous one or more steps, along with sensor data from a current acquisition are used by the change prediction system 170 to successively update the various components of the persistence model and thus to produce the persistence likelihoods. Accordingly, as the vehicle 100 progresses through the environment some features are eclipsing from the observation windows of the vehicle 100 while others are moving into the observation window. Moreover, some of the same features are observed over multiple scans as the vehicle 100 progresses. Thus, the persistence likelihoods are, in one embodiment, constantly updated through a recursive process that accounts for previous observations of the same feature. In this way, the change prediction system 170 uses the sensor data acquired over a pass through the environment to generate the persistence likelihoods and determine whether a feature still exists.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangement, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangement, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes and data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g. a driver or a passenger). The vehicle 100 can include an output system 135. An "output system" includes any device, component, or arrangement or groups thereof that enable information/data to be presented to a vehicle passenger (e.g. a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the change prediction system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the change prediction system 170, and/or the autonomous driving module(s) 160 may control some or all of these vehicle systems 140 and, thus, may be partially or fully autonomous.

The processor(s) 110, the change prediction system 170, and/or the autonomous driving module(s) 160 can be operatively connected to communicate with the various vehicle systems 140 and/or individual components thereof. For example, returning to FIG. 1, the processor(s) 110, the change prediction system 170, and/or the autonomous driving module(s) 160 can be in communication to send and/or receive information from the various vehicle systems 140 to control the movement, speed, maneuvering, heading, direction, etc. of the vehicle 100. The processor(s) 110, the change prediction system 170, and/or the autonomous driving module(s) 160 may control some or all of these vehicle systems 140.

The processor(s) 110, the change prediction system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the change prediction system 170, and/or the autonomous driving module(s) 160 can control the direction and/or speed of the vehicle 100. The processor(s) 110, the change prediction system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the change prediction system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the feature-based map 250 as implemented by the prediction module 230. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A change prediction system for identifying changes within a surrounding environment of a vehicle, comprising:
    one or more processors;
    a memory communicably coupled to the one or more processors and storing:
    a sensor module including instructions that when executed by the one or more processors cause the one or more processors to collect, using at least one sensor of the vehicle, sensor data about the surrounding environment,
    wherein the sensor module includes instructions to analyze the sensor data to identify features of the surrounding environment, wherein the features are landmarks of the surrounding environment that are indicated within a map of the surrounding environment, and wherein the sensor data indicates at least measurements associated with the features as acquired by the at least one sensor; and
    a prediction module including instructions that when executed by the one or more processors cause the one or more processors to compute persistence likelihoods for the features according to a persistence model that characterizes at least prior observations of the features and relationships between the features, wherein the persistence likelihoods indicate estimated persistences of the features to identify whether the features exist,
    wherein the prediction module includes instructions to compute the persistence likelihoods including instructions to combine a joint detection likelihood, a joint prior distribution, and a joint evidence associated with the features and data associations of the features determined from the sensor data to produce the persistence likelihoods, and
    wherein the prediction module includes instructions to control the vehicle according to the persistence likelihoods.

2. The change prediction system of claim 1, wherein the prediction module includes instructions to compute the persistence likelihoods including instructions to estimate the data associations between the features and the measurements and apply the persistence model to characterize whether the features exist at a present time.

3. The change prediction system of claim 2, wherein the prediction module includes instructions to compute the persistence likelihoods including instructions to compute the joint detection likelihood to indicate probabilities that the features are detected within the sensor data given that the features actually exists.

4. The change prediction system of claim 2, wherein the prediction module includes instructions to compute the persistence likelihoods including instructions to compute the joint prior distribution for the features that characterizes whether the features have been detected over a series of scans of the surrounding environment including a scan embodied by the sensor data, and wherein the joint prior distribution accounts for dependencies between the features in relation to persistence of the features.

5. The change prediction system of claim 2, wherein the prediction module includes instructions to compute the persistence likelihoods including instructions to compute the joint evidence of the features that indicates a marginal measurement probability that includes accounting for the measurements for the features from the sensor data and past measurements for the features.

6. The change prediction system of claim 1,
    wherein the sensor module includes instructions to identify the features including instructions to correlate the measurements with the features to generate the data associations according to a joint compatibility branch and bound (JCBB) determination, and
    wherein the map is a sparse feature-based map that is structured to include correlations between the features.

7. The change prediction system of claim 1, wherein the prediction module includes instructions to control the vehicle according to the persistence likelihoods including instructions to update the map according to the persistence likelihoods when the persistence likelihoods indicate that at least one of the features is likely not present, and
    wherein the prediction module includes instructions to control the vehicle including instructions to adjust planning of one or more vehicle systems of the vehicle according to the persistence likelihoods to improve the planning by avoiding references to one of the features that is no longer present.

8. The change prediction system of claim 1, wherein the vehicle operates at least semi-autonomously.

9. A non-transitory computer-readable medium for identifying changes within a surrounding environment of a vehicle and including instructions that when executed by one or more processors cause the one or more processors to:
    collect, using at least one sensor of the vehicle, sensor data about the surrounding environment;
    analyze the sensor data to identify features of the surrounding environment, wherein the features are landmarks of the surrounding environment that are indicated within a map of the surrounding environment, wherein the sensor data indicates at least measurements associated with the features as acquired by the at least one sensor;
    compute persistence likelihoods for the features according to a persistence model that characterizes at least prior observations of the features and relationships between the features, wherein the persistence likelihoods indicate estimated persistences of the features to identify whether the features exist,
    wherein the instructions to compute the persistence likelihoods including instructions to combine a joint detection likelihood, a joint prior distribution, and a joint evidence associated with the features and data associations of the features determined from the sensor data to produce the persistence likelihoods; and
    control the vehicle according to the persistence likelihoods.

10. The non-transitory computer-readable medium of claim 9, wherein the instructions to compute the persistence likelihoods include instructions to estimate the data associations between the features and the measurements and apply the persistence model to characterize whether the features exist at a present time.

11. The non-transitory computer-readable medium of claim 10, wherein the instructions to compute the persistence likelihoods include instructions to compute the joint detection likelihood to indicate probabilities that the features are detected within the sensor data given that the features actually exists.

12. The non-transitory computer-readable medium of claim 10, wherein the instructions to compute the persistence likelihoods includes instructions to compute the joint prior distribution for the features that characterizes whether the features have been detected over a series of scans of the surrounding environment including a scan embodied by the sensor data, and wherein the joint prior distribution accounts for dependencies between the features in relation to persistence of the features.

13. The non-transitory computer-readable medium of claim 10, wherein the instructions to compute the persistence likelihoods include instructions to compute the joint evidence of the features that indicates a marginal measurement probability that includes accounting for the measurements for the features from the sensor data and past measurements for the features.

14. A method of identifying changes within a surrounding environment of a vehicle, comprising:
   collecting, using at least one sensor of the vehicle, sensor data about the surrounding environment;
   analyzing the sensor data to identify features of the surrounding environment, wherein the features are landmarks of the surrounding environment that are indicated within a map of the surrounding environment, wherein the sensor data indicates at least measurements associated with the features as acquired by the at least one sensor;
   computing persistence likelihoods for the features according to a persistence model that characterizes at least prior observations of the features and relationships between the features, wherein the persistence likelihoods indicate estimated persistences of the features to indicate whether the features likely still exist,
   wherein computing the persistence likelihoods includes combining a joint detection likelihood, a joint prior distribution, and a joint evidence associated with the features and data associations of the features determined from the sensor data to produce the persistence likelihoods; and
   controlling the vehicle according to the persistence likelihoods.

15. The method of claim 14, wherein computing the persistence likelihoods includes estimating the data associations between the features and the measurements and applying the persistence model to characterize whether the features exist at a present time.

16. The method of claim 15, wherein computing the persistence likelihoods includes computing the joint detection likelihood to indicate probabilities that the features are detected within the sensor data given that the features actually exists.

17. The method of claim 15, wherein computing the persistence likelihoods includes computing the joint prior distribution for the features that characterizes whether the features have been detected over a series of scans of the surrounding environment including a scan embodied by the sensor data, and wherein the joint prior distribution accounts for dependencies between the features in relation to persistence of the features.

18. The method of claim 15, wherein computing the persistence likelihoods includes computing the joint evidence of the features that indicates a marginal measurement probability that includes accounting for the measurements for the features from the sensor data and past measurements for the features.

19. The method of claim 14,
   wherein identifying the features includes correlating the measurements with the features to generate the data associations according to a joint compatibility branch and bound (JCBB) determination, and
   wherein the map is a sparse feature-based map that is structured to include correlations between the features.

20. The method of claim 14, wherein controlling the vehicle according to the persistence likelihoods includes updating the map according to the persistence likelihoods when the persistence likelihoods indicate that at least one of the features is likely not present, and
   wherein controlling the vehicle includes adjusting planning of one or more vehicle systems of the vehicle according to the persistence likelihoods to improve the planning by avoiding references to one of the features that is no longer present.

* * * * *